(12) United States Patent
Lemieux et al.

(10) Patent No.: US 7,292,575 B2
(45) Date of Patent: Nov. 6, 2007

(54) METHOD AND SYSTEM FOR MULTI-PROTOCOL LABEL SWITCHING (MPLS) BASED DATA FLOW AGGREGATION IN A THIRD GENERATION (3G) CELLULAR TELECOMMUNICATION SYSTEM

(75) Inventors: Yves Lemieux, Kirkland (CA); Laurent Marchand, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1036 days.

(21) Appl. No.: 10/200,761

(22) Filed: Jul. 24, 2002

(65) Prior Publication Data

US 2004/0017796 A1    Jan. 29, 2004

(51) Int. Cl.
   *H04J 3/26*    (2006.01)
(52) U.S. Cl. .................................. 370/392; 370/474
(58) Field of Classification Search ................ 370/392, 370/393, 474
   See application file for complete search history.

(56) References Cited

U.S. PATENT DOCUMENTS

| | | | |
|---|---|---|---|
| 6,408,001 B1 | 6/2002 | Chuah et al. | 370/392 |
| 6,683,874 B1 * | 1/2004 | Nagami et al. | 370/392 |
| 2003/0039246 A1 * | 2/2003 | Guo et al. | 370/389 |

FOREIGN PATENT DOCUMENTS

| | | |
|---|---|---|
| CA | 2292252 | 4/2001 |
| EP | 0987921 | 3/2000 |
| EP | 1 294 202 | 3/2003 |
| WO | WO 00/45560 | 8/2000 |
| WO | WO 02/054795 | 7/2002 |

OTHER PUBLICATIONS

International Search Report dated May 17, 2004 received in corresponding PCT application No. PCT/CA03/01084.
IETF, Network Working Group, Request for Comments: 3270, "Multi-Protocol Label Switching (MPLS) Support of Differentiated Services".
Internet Draft: "Extension of LDP for Mobile IP Service through the MPLS Network", authors: Jun Kyun Choi, Tai Won Um, Yoo Kyoung Lee, Sun Hee Yang, expiration date: Feb. 2002.

* cited by examiner

*Primary Examiner*—Melvin Marcelo
(74) *Attorney, Agent, or Firm*—Alex Nicolaescu; Ericsson Canada Inc.

(57) ABSTRACT

A method and packet switched cellular telecommunication system wherein data flows from a terminal are aggregated into one or more Multi Protocol Label Switching (MPLS) Label Switched Path (LSP) based on at least one criterion. In a first embodiment, the data flows are aggregated into LSP(s) based on a Quality of Service (QoS) class of each such data flows, by a Network Node, such as a Radio network Controller (RNC) or a Serving GPRS Support Node (SGSN). In a second embodiment, the data flows or LSPs are aggregated into another LSP(s) based on the destination routing area. The LSP aggregation is performed by an Edge Node of the routing area, such as a Gateway GPRS Support Node (GGSN). In a first variant of the $2^{nd}$ embodiment, the aggregation is used for macro-mobility, while in yet another variant the same aggregation is used for defining a virtual private network.

24 Claims, 8 Drawing Sheets

| QoS Class (eg. DSCP) | LSP |
|---|---|
| Voice | # 1 |
| Video | # 2 |
| FTP | # 2, # 3 |
| Web Browsing | # 4 |

| Destination Routing Area | LSP |
|---|---|
| R.A. B | # 10 |
| R.A. C | # 12 |
| R.A. D | # 14, # 16 |

METHOD AND SYSTEM FOR MULTI-PROTOCOL LABEL SWITCHING (MPLS) BASED DATA FLOW AGGREGATION IN A THIRD GENERATION (3G) CELLULAR TELECOMMUNICATION SYSTEM

BACKGROUND OF THE INVENTION

1. Field of the Invention

The present invention relates to Third Generation (3G) cellular telecommunications systems, and in particular to a method and system for Multi-Protocol Label Switching (MPLS) based data flow aggregation in a $3^{rd}$ Generation (3G) cellular telecommunications system.

2. Description of the Related Art

UMTS (Universal Mobile Telecommunications Service) is a Third-Generation (3G), broadband, packet-based transmission of text, digitized voice, video, and multimedia at data rates up to 2 Megabits per second (Mbps) that offers a consistent set of services to mobile computer and phone users independently of their location in the world. Based on the Global System for Mobile (Global System for Mobile communication) communication standard, UMTS, endorsed by major standards bodies and manufacturers, is the planned standard for mobile users around the world. With UTMS, computer and phone users are constantly attached to the Internet as they travel and, through the roaming service, have the same set of capabilities no matter where they go. Especially at the beginning of UMTS deployment, users can have multi-mode mobile devices that switch to the locally available technology (such as GSM 900 and 1800) where UMTS is not yet available.

Today's cellular telephone systems are mainly circuit-switched, with connections always dependent on circuit availability. Packet-switched connection, using the Internet Protocol (IP) will also make possible to provide new services, such as alternative billing methods (pay-per-bit, pay-per-session, flat rate, asymmetric bandwidth, and others). The higher bandwidth of UMTS also promises new services, such as video conferencing. UMTS promises to realize the Virtual Home Environment in which a roaming user can have the same services to which the user is accustomed when at home or in the office, through a combination of transparent terrestrial and satellite connections.

UMTS is also planned to revolutionize operators network with better frequency efficiency and lower transport costs by utilizing Asynchronous Transfer Mode (ATM) communications for both voice and data services, as defined for example in the Technical Specification Group Services and System Aspects; Release 1999 Specifications: 3rd Generation Partnership Project, 3GPP TS 21.101 version 3.7.0, herein included by reference. UMTS is based on the General Packet Radio Service (GPRS) core networking with its seamless high-speed delivery of data for point-to-point applications, which allows innovative services to be created. However, GPRS uses GPRS Tunnelling Protocol (GTP) to forward packets from the GGSNs (GPRS Gateway Service Nodes) to the SGSNs (Serving GPRS Service Nodes) in order to reach a mobile device, dynamically setting up communication tunnels between the GGSN and the mobile unit home network, and allowing the mobile unit to have its home network served beyond the GGSN Internet Gateway. But GTP is deficient in terms of session set-up and hand-off response time because of its complex plurality of primitives involved, as well as in terms of sessions' reliability due to the non-negligible probability of data routing failure during the communications sessions.

GTP includes both signalling (GTP-C for the Control Plane) and data payload (GTP-U for the Data Plane) transfer procedures. In the signalling plane, GTP-C specifies a tunnel control and management protocol that allows the SGSN to provide GPRS services for a mobile station with signalling that creates, modifies and deletes communications tunnels. For that purpose, the User Datagram Protocol (UDP) is used as the protocol for transferring signalling messages between GPRS service nodes. In the transmission plane, GTP-U uses a tunnelling mechanism to carry user data packets. The whole specification for GTP can be found in the Release 1999 Specifications: 3rd Generation Partnership Project, 3GPP—Technical Specification TS29.060, General Packet Radio Service (GPRS); GPRS Tunneling Protocol across the Gn and Gp interface, herein included by reference.

Figure 1:
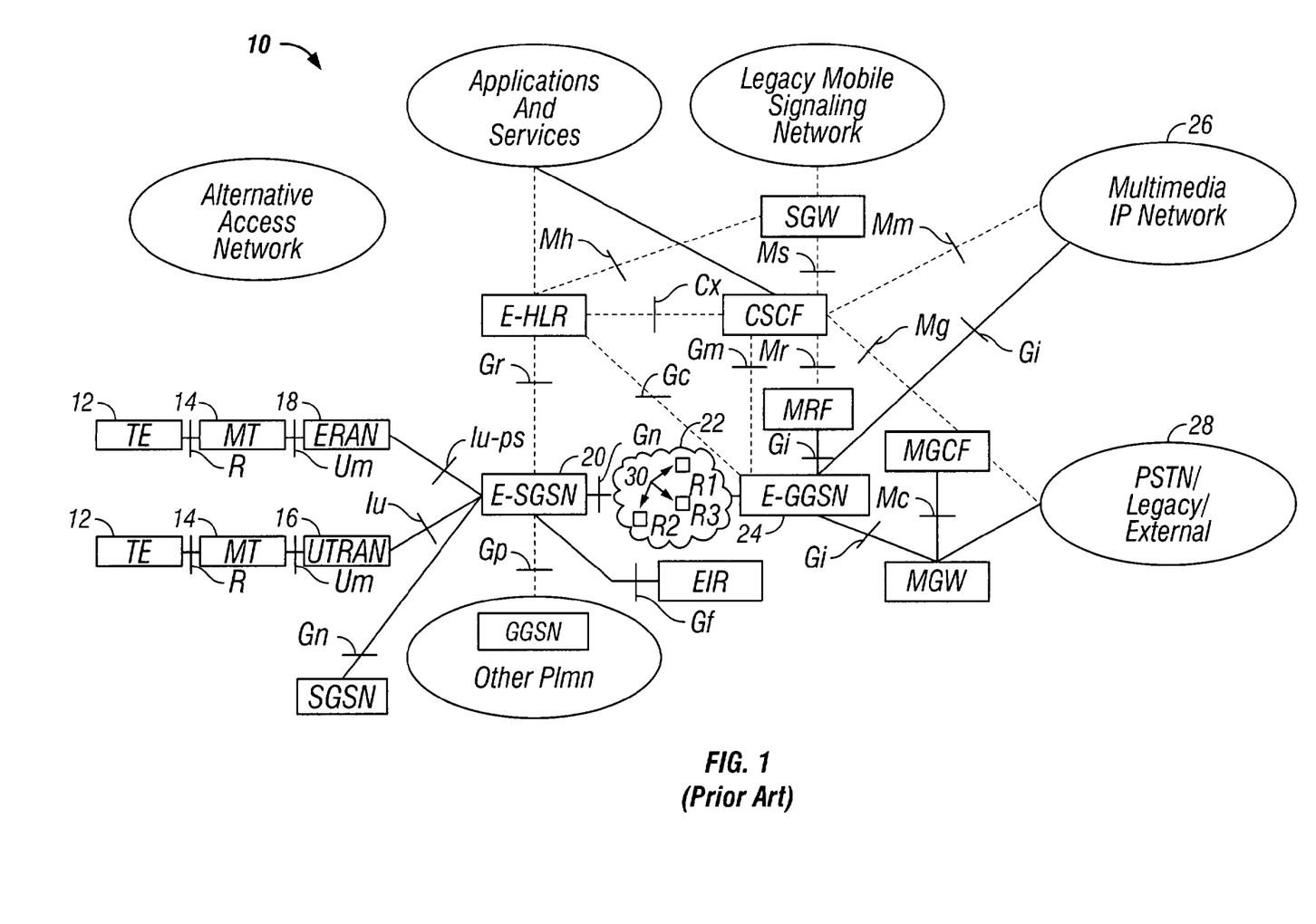
FIG. 1 (Prior Art) is a high-level network reference model of a known Enhanced General Packet Radio Service (EG-PRS) cellular telecommunications system.

Reference is now made to FIG. 1 (Prior Art), which shows a high-level reference model diagram of a prior art Third Generation IP (3G.IP) cellular telecommunications system 10. Terminal Equipment (TE) 12 and Mobile Terminals (MTs) 14 communicate via the UMTS Radio Access Network (UTRAN) 16 and/or the Enhanced Datarate for GSM Evolution (EDGE) Radio Access network (ERAN) 18 with an Enhanced SGSN (ESGSN) 20 of the system 10. The ESGSN 20 provides the direct access point for the terminals 12 and 14, and is connected via a Gn interface 22 to at least one Enhanced GGSN (EGGSN) 24 that provides the gateway to SGSN across mobile networks that the users may visit. The GGSN 24 is also the access point for other packet data networks 26 and 28, allowing someone to, for instance, send an email from a (fixed network) PC to someone with a GPRS phone. Other nodes are as well illustrated in FIG. 1, although for simplification purposes their function is not described herein. It will be however understood by those skilled in the art that these nodes are those described in the Third Generation Partnership Project (3GPP) Technical Specification 3GPP TS 23.002, V3.5.0, Network Architecture, herein included by reference. The Gn interface 22 uses GTP tunnelling to forward packets from EGGSN 24 to ESGSN 20 to reach a mobile device, dynamically setting up tunnels between GGSN and its home network and allowing the mobile unit to have its home network served beyond the GGSN Internet Gateway. However, it is recognized that, for example, the Gn interface lacks reliability in supporting continuous data sessions, i.e. it happens that IP routers 30 of the Gn interface 22 responsible for transmitting the data flow between the ESGSN 20 and the EGGSN 24 may experience failures for various reasons. When these malfunctions occur, it was realized that it may take up to 90 seconds for a fail over router to effectively take over and successfully redirect the same communication.

Figure 2:
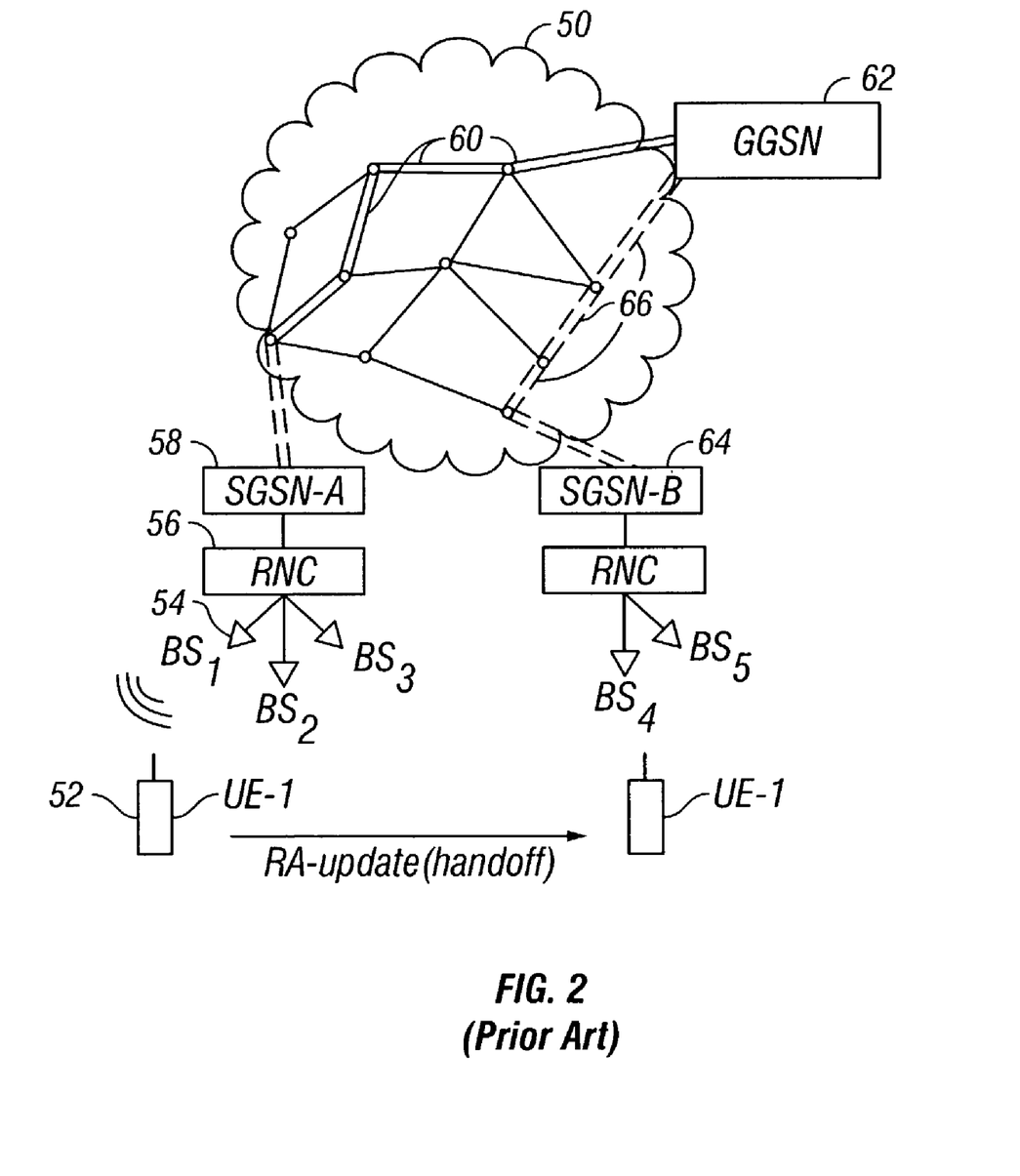
FIG. 2 (Prior Art) is a high-level network diagram illustrating a deficiency of an existing GPRS network in the context of User Equipment (UE) handoff.

Also detrimental to the normal operation of GPRS-based networks is the transfer of user data packets during a mobile terminal hand-off (intra or inter GGSN). Reference is now made to FIG. 2 (Prior Art), which shows an exemplary high-level network diagram of an existing GPRS network 50, wherein a Mobile Terminal (MT) 52 is provided packets switched cellular service via a Base Station 1 (BS 1) 54, connected to a Radio Network Controller (RNC) 56, which is itself connected to an SGSN-A 58. The packet data of the data session carried on by the MT 52 is transported via the GTP tunnel 60 established between the SGSN-A 58 and the GGSN 62. In current implementations, when the user equipment 52 is handed-off from the routing area served by the SGSN-A 58 to another routing area served by another SGSN, such as for example by the SGSN-B 64, a new GTP tunnel 66 must be established between the GGSN 62 and the target SGSN-B 64. In such a case, in existing GPRS networks, the switching between GTP tunnels, for instance, requires user data packets to be kept in a queue for typically 0.5 to 5 seconds before the switch becomes effective from the old GTP tunnel 60 to the new GTP tunnel 66. It is therefore difficult to contemplate sending time sensitive traffic, such as voice traffic and video conferencing traffic over the current GPRS systems, when traffic encounters core network delays (excluding IP-Backbone delay) well over 500-5000 ms.

Although there is no prior art solution as the one proposed hereinafter for solving the above-mentioned deficiencies, the Multi Protocol Label Switching (MPLS) technology, described in the request for Comments RFC 3031, bears some relation with the field of the present invention, by aiming at achieving fast and simple forwarding of IP traffic. In MPLS, routing information is signalled between neighbouring nodes and a group of virtual paths known as Label Switched Paths (LSP) are established between the edges of the MPLS network. In MPLS, a packet flow is classified or labelled by an MPLS network's entry node onto an LSP that will adequately direct the packet flow towards the exit node, and will also forward the packet data flow toward the destination. Each MPLS node that participates in the LSP is known as a Label Switched Router (LSR). Each LSR along the LSP has an incoming and outgoing labels binding that represent the routing information at each LSR and indicate the forwarding direction as well as forwarding behaviour to be applied to the packet flow. The incoming and outgoing labels for each LSR therefore act as shorthand for routing, and are pre-signalled between neighbouring nodes through special protocols such as Label Distribution Protocol (LDP) [RFC 3036]. LSR packet flow forwarding in that scenario becomes a simple label lookup and swapping (changing incoming to outgoing labels) operations, rather than best prefix match as in traditional routing. When the packet flow reaches the exit node of the MPLS network, the packet flow is unlabelled and forwarded toward the destination point.

Some extensions to existing routing protocols have been proposed to enable explicit routing in MPLS networks such as traffic engineering extensions to RSVP (RSVP-TE) and Constraint Routing LDP (CR-LDP). The main goal of explicit routing is to have only one destination for each entering packet bringing the logic of path establishment to the network's edges. Packets are classified at the edge into their explicit path and do not need to carry the explicit routing information as in traditional IP networks. Those extensions fill the objective of traffic engineering to avoid over-utilizing certain paths for traffic forwarding while other paths in the network remain under-utilized.

While MPLS simplifies forwarding of IP data, it does not provide QoS. In fact, MPLS nodes do not take any QoS parameters into account for the forwarding of packets, but rather interpret each packet's label to forward it accordingly.

Accordingly, it should be readily appreciated that in order to overcome the deficiencies and shortcomings of the existing solutions, it would be advantageous to have a method and system for effectively supporting data communications in a GPRS/UMTS cellular telecommunications network. The present invention provides such a method and system.

SUMMARY OF THE INVENTION

In one aspect, the present invention is a method for packet data transmission in a packet switched cellular telecommunications system, the method comprising the steps of:

receiving data flows in a network node of the packet switched cellular telecommunications system; and aggregating said data flows into at least one Multi Protocol Label Switching (MPLS) Label Switched Path (LSP) based on at least one criterion.

In another aspect, the present invention is a packet switched cellular telecommunications system comprising:

a plurality of User Equipments (UEs) generating data flows; and a network node receiving said data flows and aggregating said data flows into at least one Multi Protocol Label Switching (MPLS) Label Switched Path (LSP) based on at least one criterion.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 3.*a* is an exemplary high-level network diagram of the preferred embodiment of the present invention showing the data flows aggregation into Multi Protocol Label Switching (MPLS) Label Switched Paths (LSPs);

FIG. 3.*b* shows a simplified network diagram schematically illustrating the preferred embodiment of the invention;

DETAILED DESCRIPTION OF THE PREFERRED EMBODIMENTS

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

The present invention provides a method and system for data transmission based on the Multi Protocol Label Switching (MPLS) for use within mobile systems that may be based on the General Packet Radio Service (GPRS) network architecture, wherein GPRS Tunneling Protocol (GTP) is partly or totally replaced by MPLS' Label Switched Paths (LSPs). MPLS is a standards-approved technology for speeding up network traffic flow and making it easier to manage. MPLS involves setting up a specific path for a given sequence of data packets, identified by a label put in each packet, thus saving the time needed for a router to look up the address to the next node to forward the packet to. MPLS works with the Internet Protocol (IP) at layer 3, Asynchronous Transport Mode (ATM), and frame relay network protocols at layer 2, respectively (and other L2 technologies including Ethernet, Packet over Sonet etc.). With reference to the standard model for a network (the Open Systems Interconnection, or OSI model), MPLS allows most packets to be forwarded at the layer 2 (switching) level rather than at the layer 3 (routing) level. In addition to moving traffic faster overall, MPLS makes it easier to manage a network for Quality of Service (QoS). The present invention further provides a network architecture wherein the LSP is provided for both data micro-flows and aggregated flows, which are setup, maintained and torn down using the label distribution protocol (LDP). LDP defines a means by which Label Switched Routers (LSRS) establish LSPs through a network by mapping network layer routing information directly to the link layer switched paths. This is accomplished using labels, which create a simple forwarding paradigm. A critical element in assigning a label is that the device, which will be using the label to forward packets, will be forwarding all packets with the same label in the same way. LDP distributes labels over the MPLS network by associating certain local labels between different label peers. It uses routing information (or information resources via the control plane) to bind labels to a certain forwarding equivalence class (FEC).

According to a first preferred embodiment of the present invention, User Equipment (UE) generated data flows are aggregated into one or more MPLS LSPs based on a pre-defined criterion or criteria. With respect to the data flows, it is a know fact that each user application of an UE, such as for example the web-browsing, may create multiple data flows, one for the imaging, one for the text transfer, one for the background etc. The data flows received from the UEs via a series of Base Stations (BSs) are aggregated at the level of a network node, such as for example by a Radio Network Controller (RNC) or by a serving GPRS Support Node (SGSN), preferably based on a specific criterion, such as for example the Quality of Service (QoS) class associated with each one of the data flows. Thus, according to the invention, data flows having the same QoS requirement, for example "QoS class=video streaming", are aggregated by the network node into one or more LSPs dedicated to video streaming, which is further sent toward the destination of the traffic using that (these) LSP(s).

According to another preferred embodiment of the invention, data flows under the form of MPLS LSPs, that may or may not have been treated according to the above-indicated first preferred embodiment of the invention, are aggregated into another one or more MPLS LSPs based on another criterion or criteria. The present aggregation may also provide for the macro mobility, and may combine traffic from one or more RNCs before the traffic gets into the IP backbone or a transit network on its way to a different routing area. An Egde Node of the originating routing area aggregates MPLS LSPs into one or more other LPSs based on the identity of the destination area of the original data flows. Thus, all the traffic between the originating routing area and a given destination area is aggregated into the one or more LSP(s).

According to the invention, existing signaling plane for the GTP may be replaced by signaling based on the Resource Reservation Protocol (RSVP), and/or the Label Distribution Protocol (LDP), which is used to establish the MPLS' LSPs.

Figure 3A:
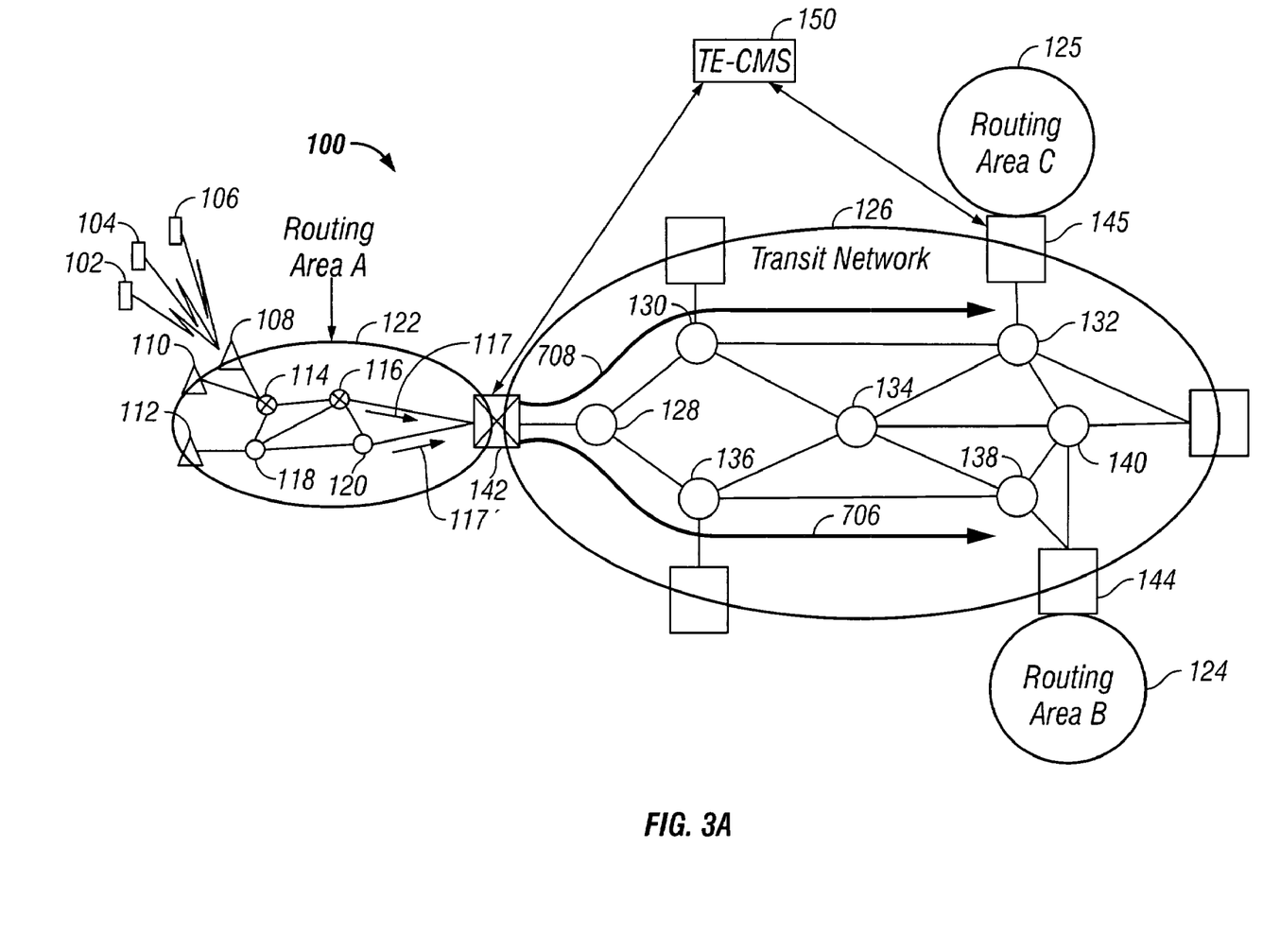

Referring now to FIG. 3, depicted therein in FIG. 3.*a* is an exemplary high-level network diagram illustrating the preferred embodiments of the present invention directed to the implementation of data flows aggregation in a packet switched cellular telecommunications system 100 that implements MPLS. Shown in FIG. 3.*a*, is a first routing area 122 comprising a number of Mobile Terminals (MTs, also called herein User Equipment (UE)) 102-106 receiving radio cellular service from one or more Base Stations (BSs) 108-112 controlled by a number of Radio Network Controllers (RNCs) 114 and 118, which connect in turn to one or more Serving GPRS Support Nodes (SGSNs) 116 and 120. Other routing areas are also illustrated, such as for example the routing area B 124 and the routing area C 125. It is understood that these routing area may also comprise RNCs that control a number of BSs serving a plurality of MTs, although these elements are not shown for simplicity purposes. An IP backbone/transit network 126 connects the first routing area 122 to the other routing areas 124-125 via a transit network 126 comprising a plurality of IP routers, bridges and other switching nodes 128-140. The routing areas 122, 124, and 125 connect to the IP backbone network 126 via respective Edge Nodes 142, 144, and 145, that may be for example Gateway GPRS Support Nodes (GGSNs).

With reference being further made to FIG. 3.*a*, when a call session is set-up between an MT 102 served by a BS 108 controlled by an RNC 114 of routing area A 122, and another MT of the routing area B 124, such as for example using the 3GPP TS 23.207 v 5.4.0, July 2002, "End-to-End QoS Concept and Architecture, a network node, such as for example the network node 114 of the routing area A 122 receives the data flows of the communication from the MT 102. Depending upon the type of communication application run by the MT 102, each data flow originated by the application run by the MT 102 has an associated Quality of Service (QoS) class identifying a requirement for a specific QoS. For example, MT 102 may run a video-conferencing application that originates different data flows for i) video streaming, ii) sound, and ii) text, with each such data flow having associated a QoS class, such as for example as shown in following table:

| Data Flow | QoS Class | Class Description |
| --- | --- | --- |
| Video | 1 | Best (Real-Time) |
| Sound | 2 | Best (Real-Time) |
| Text | 3 | Normal (Best-Effort) |

Figure 3B:
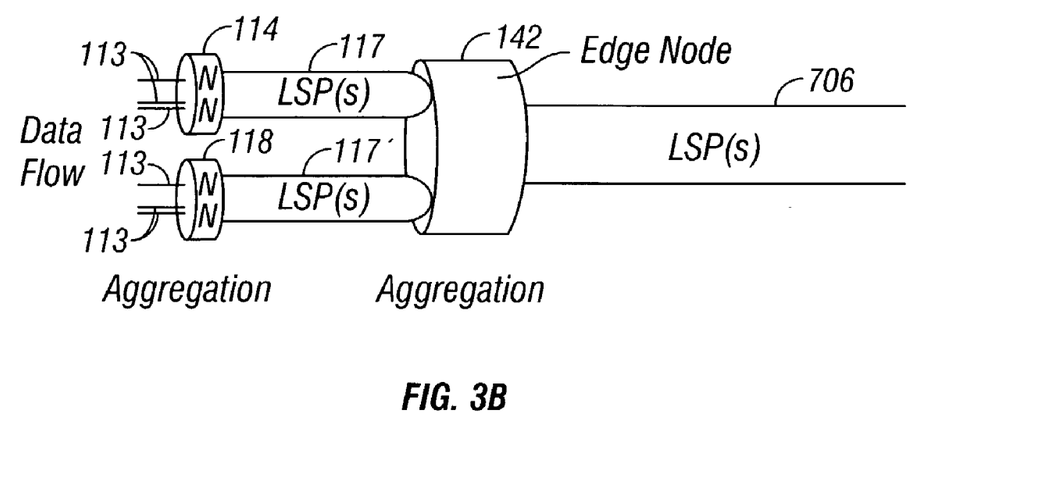

In a similar manner, all MTs 104-106, as well as the other MTs served by the same network node 114 generate data flows 113, as illustrated in FIG. 3.*b*, the data flows being received by the network node 114.

Figure 4:
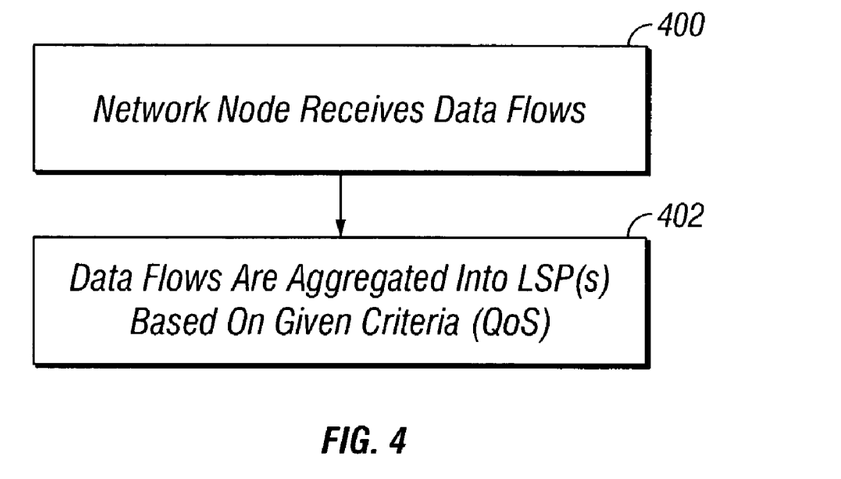
FIG. 4 is an exemplary nodal operation and signal flow diagram of the preferred embodiment of the invention related to an UE routing area hand-off using the invented data flow aggregation.

Reference is now made to FIG. 4, which shows a flow-chart diagram of the first preferred embodiment of the invention. At step 400, the network node receives the different data flows from the served MTs, and in step 402, the network node aggregates data flows based on a pre-defined criterion or criteria into one or more MPLS LSPs. In the present exemplary embodiment, the data flows are aggregated based on their QoS class requirement. Thus, in the present example, all the data flows having a given QoS class, such as for example all video streaming data flows having QoS class 1 that are received by the network node 114, are aggregated by the network node into one or more MPLS LSP(s) that is (are) dedicated to video streaming.

Figure 5:
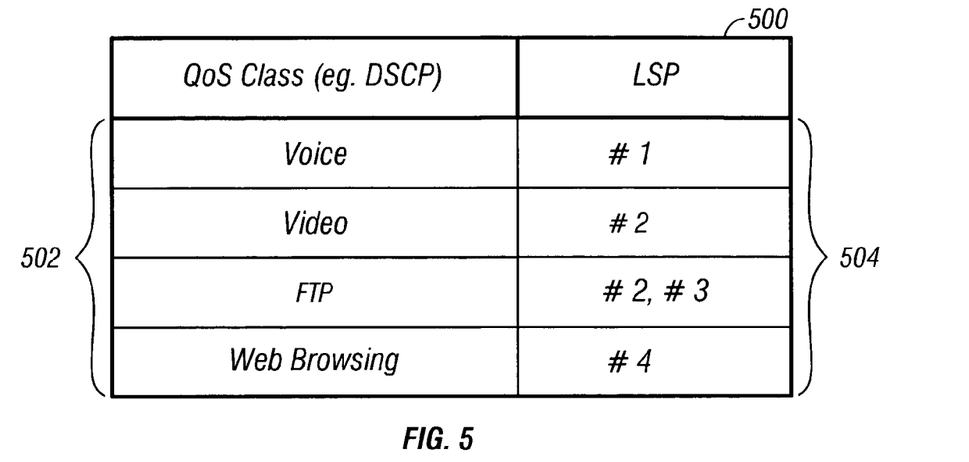
FIG. 5 is an exemplary correspondence table used by the network node for performing the data flow aggregation.

Reference is now made to FIG. 5, which shows an exemplary correspondence table 500 that may be used and comprised by the network node 114 for performing the data flows aggregation. Table 500 comprises in the first column the possible types of QoS 502 that are associated with the LSP labels 504 of the second column of table 500. For example, according to table 500, all the video streaming data flows are aggregated by the network node onto the LSP identified by the label #2, while all FTP data flows are aggregated by the network node onto LSPs labeled #2 and #3.

FIG. 3.b shows a simplified network diagram illustrating the preferred embodiment of the invention. Once the data flows 113 are aggregated into the one or more LSPs 117, the LSP(s) 117 transport(s) the data flows toward the Edge Node 142 of the routing area of origin 122. Shown in FIG. 3.b is also another network node 118, that may perform similar aggregation of data flows 113' it receives, into one or more LSPs 117', as does the network node 114.

According to the preferred embodiment of the invention, the aggregation of data flows 113 may be preferably performed by a network node 114 that may be a Radio Network Controller (RNC) or a Serving GPRS Support Node (SGSN) of the originating routing area A 122.

With reference being now further made to FIG. 3.a, a second preferred embodiment of the present invention will be described. Once the data flows 113 are aggregated into MPLS LSPs 117 and 117', the LSP traffic destined to other routing areas than the originating routing area 122 is sent to the Edge Node 142 of the originating routing area 122, where LSPs that are destined to the same destination routing area are aggregated into another one or more LSPs, which is dedicated to communications with only that destination routing area.

Figure 6:
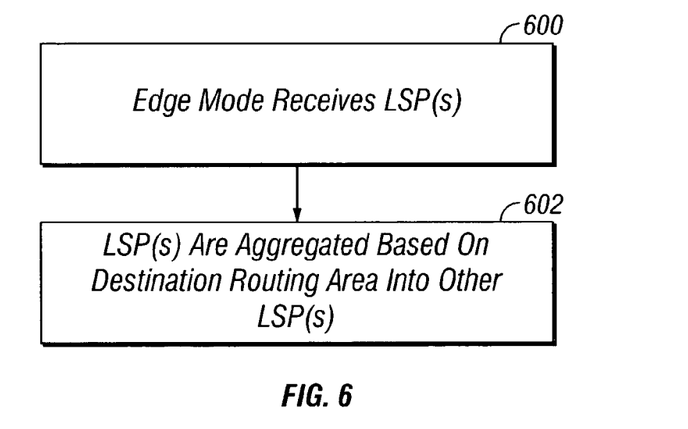
FIG. 6 is an exemplary high-level flowchart diagram of the second preferred embodiment of the present invention.

The steps of the second preferred embodiment of the present invention are shown in FIG. 6, which is a high-level flowchart diagram of this $2^{nd}$ preferred embodiment. At step 600, the Edge Node 142 receives the data flows, or MPLS LSPs, that carry traffic originating from the UEs of the originating routing area 122, and destined to other routing areas, such as for example to routing areas B 124 and C 125 (shown in FIG. 3.a). Further in step 602, the Edge Node 142 aggregates the received LSPs into one or more other LSPs based on the destination routing area criterion.

Figure 7:
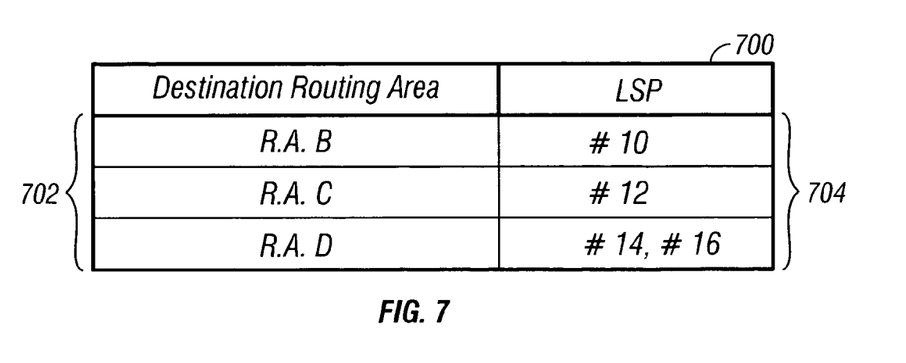
FIG. 7 shows a correspondence table used for performing the second preferred embodiment of the invention.

Reference is now made to FIG. 7, which is a correspondence table 700 that may be used by the Edge Node 142 for the purpose of performing the $2^{nd}$ preferred embodiment of the invention. Table 700 associates the destination routing areas B, C, and D 702 of the first column with MPLS LSP labels 704 of the second column of the table. Thus, according to the correspondence table 700, all the MPLS LSPs received by the Edge node 142 that are destined to the routing area B are aggregated onto the LSP labelled #10, which LSP 706 connects the originating routing area A 122 to the routing area B 124 (better shown in FIG. 3.a). In an analogous manner, according to the correspondence table 700, all the MPLS LSPs received by the Edge node 142 that are destined to the routing area C are aggregated onto the LSP labelled #12, which LSP, marked 708, connects the originating routing area A 122 to the routing area C 125 (better shown in FIG. 3.a).

With reference being now made back to FIG. 3.b, the Edge Node 142 aggregates the incoming LSPs 117 and 117' based on the destination routing area, thus creating LSPs like the LSP 706 that is destined to only one given destination routing area.

It is to be noted that the aggregation described herein according to the second preferred embodiment of the invention may be performed both on data flows, or on LSPs first treated according to the first preferred embodiment of the invention or not. Thus, any kind of data flows or LSPs may be received and aggregated by the Edge Node 142 based on the destination routing area criterion as described.

With reference to FIG. 3.a, a Traffic Engineering-Configuration Management System (TE-CMS) 150 may be used to find the minimal working topology that is optimized through re-iteration of resource-management topology requests (deriving information from a feedback loop). As the routing of the backbone network defines IP-routes for the Level-2 aggregated Flows, the TE-CMS 150 may read the routing topologies from Ingress/Egress Router Databases. Based upon this topology information and the state of routing areas interconnections, the TE-CMS 150 determines, for example by means of least-cost and least-delay mechanisms, the best LSPs to be allocated between the origin routing area A 122 and the destination routing areas, with a plurality of paths associated with different cost/delay characteristics. Finally, the TE-CMS 150 provides the concluding best path(s) to the Ingress/Egress routers based on QoS Code Points that specify the requested quality of service parameters for the current call session.

Figure 8A:
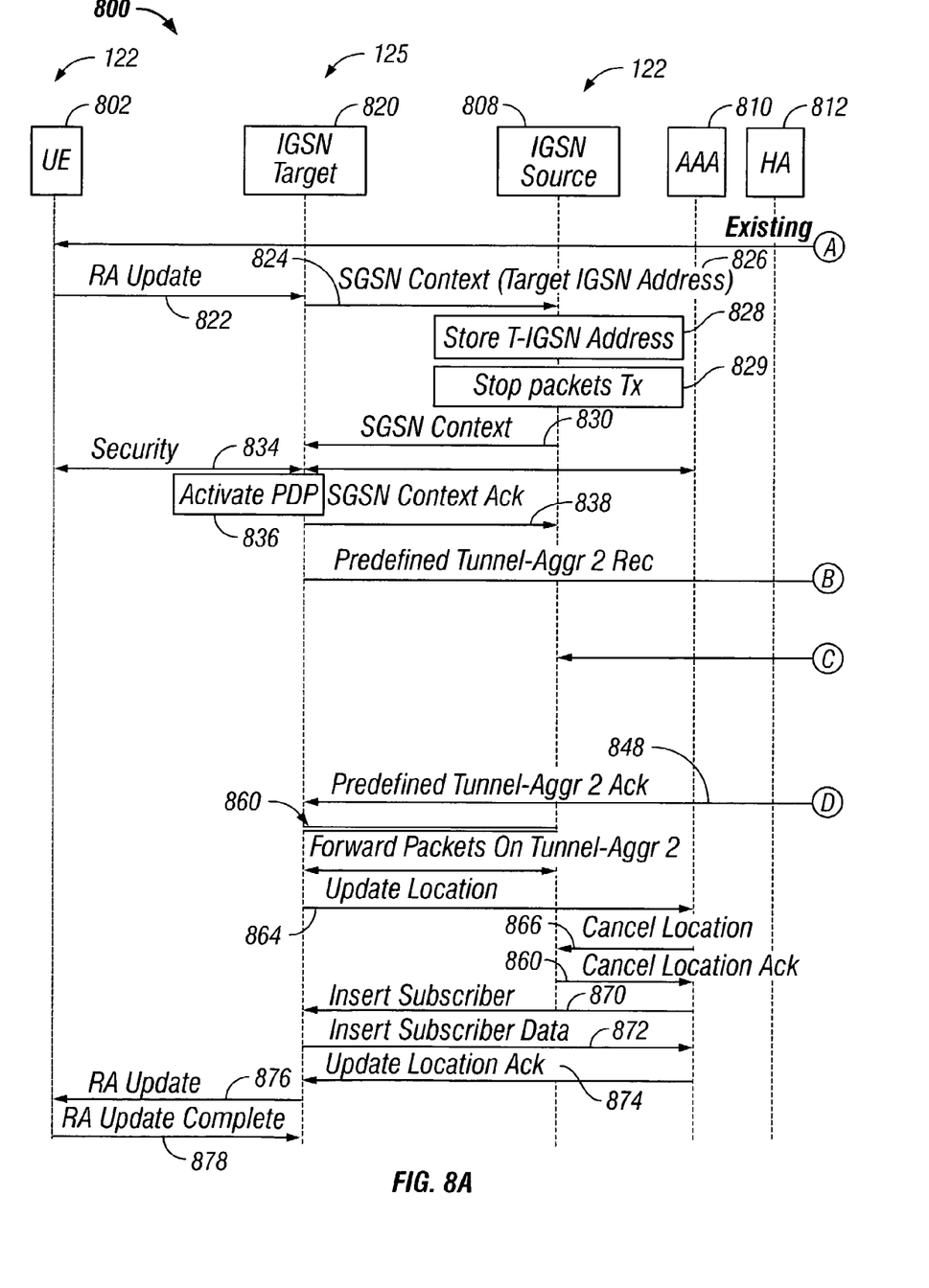
FIG. 8 is a nodal operation and signal flow diagram illustrative of an exemplary variant of the second preferred embodiment of the present invention.
Figure 8B:
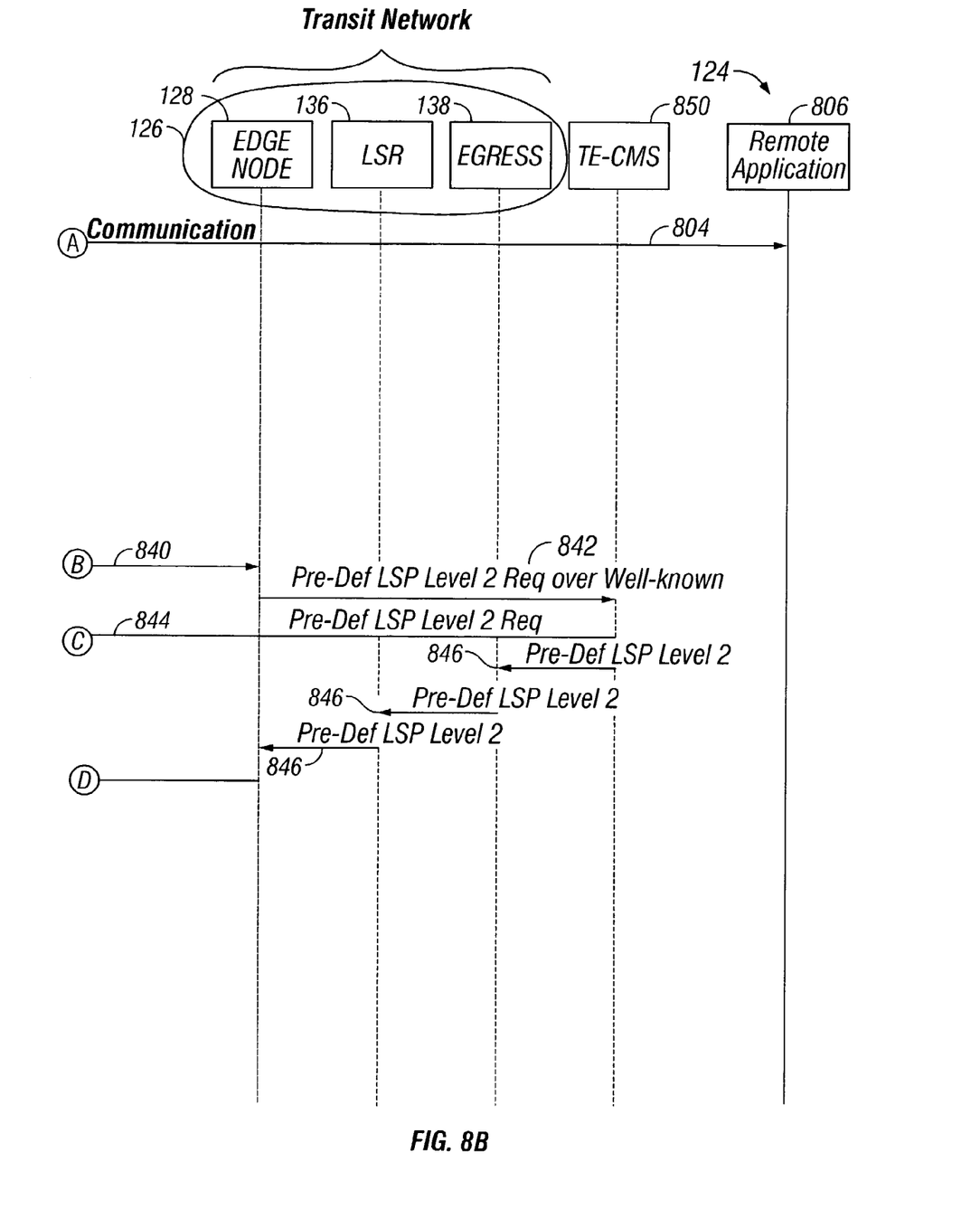

Reference is now made to FIG. 8, which is a nodal operation and signal flow diagram of a variant of the second preferred embodiment of the present invention related to the accomplishment of an inter-routing area hand-off in the packet switched cellular telecommunications network 800 implementing the LSPs aggregation based on the destination routing area criterion, as described in the present invention. Shown in the telecommunications network 800 of FIG. 8 is a User Equipment (UE) 802 of an origin routing area 122 carrying a current communication session 804 with a remote application 806 of a second routing area B 124 (the routing areas are better shown in FIG. 3.a). It is to be noted that the remote application 806 may comprise any kind of communication recipient or user equipment, including but being not limited to a mobile equipment, communication terminal, computer terminal, server, etc. The UE 802 may be provided communication service in the first routing area a 122 by a source Integrated GPRS Service Node (IGSN) 808, that may comprise a source SGSN (not shown) and a source GGSN (not shown), which may be in turn integrated with one another, or acting as separate entities. An Authentication, Authorization, and Accounting server 810 provides access control to the network resources, enforces the network policies, audits the usage, and provides the information necessary to bill for the services used by UE 802. The network 800 further comprises a Home Agent (HA) 812 that provides information for locating the UE 802 at the cell level, and for the classes of services the user of UE 802 subscribed to. The communication session 804 is further handled by a transit network 126 that connects the IGSN 808 of UE 802 to the routing area 124 of the remote application 806 of the second routing area B 124. The UE 802 is about to perform an inter-routing area handoff from the routing area a 122 to the routing area C 125. The transit network 126 connects together the routing areas and comprises nodes identified as an Edge Node (or Ingress router) 128, Egress router 138 and label Switched router (LSR) 136. A better view of the various routing areas is provided in FIG. 3.*a*.

The present scenario implements the 2$^{nd}$ preferred embodiment of the invention related to the LSP aggregation based on the destination routing area criterion. Thus, in the context of the present exemplary scenario, it is the Ingress router 128 that acts as an Edge Node of the transit network 126 and provides for the aggregation of data flows or LSPs into the one or more LSPs based on the destination routing area criterion, and not the IGSN functionality as described beforehand. It is to be noted that the 2$^{nd}$ preferred embodiment of the invention relate to the aggregation of data flows or LSPs based on the destination routing area may be performed by any kind of node that connects to the transit network laying between two or more routing area. The Egress Node 138 operates in an inverse manner, and does de-adaptation (MPLS-to-IP) at the output of the Transit Network 126. Finally, the LSR router 136 simply forward the data packets, based on an Input Label Mapping (ILM) tables provided by MPLS network (not shown). The telecommunications network 800 may further comprise a Traffic Engineering-Configuration Management System (TE-CMS) 850 responsible to find the minimal working topology through reiteration of resource-management topology requests (deriving information from a feedback loop) and that defines the preferred LSPs to be used in given call session scenarios. Regarding the aggregation based on the destination routing area, the TE-CMS 850 may, by way of example, derive from the Transit-Network (Edge-Router to Edge-Router), some current network state information. This is done by reading from Topology and Resource Databases (not shown) of the network 800. Once the network state metrics are acquired, the TE-CMS 850 may run through a constraint algorithm to satisfy the targeted optimization. Therefore, LSP optimization of the Transit-Network accounts for the nodes between Edge node and Egress Router.

With reference being further made to FIG. 8, once the communication sessions 804 is active, for the sake of the present exemplary scenario it is assumed that UE 802 is to perform an inter routing area hand-off between the source routing area A 122 and the target routing area C 125, served by a target IGSN 820. Thus, at a given moment, the UE 802 sends a routing area update request message 822 to the target IGSN 820 informing the former of a desire to perform the routing area update. Upon receipt of message 822, the target IGSN 820 sends an SGSN context request message 824 comprising a target-IGSN address 826 to the source IGSN 808 in order to get the mobility management and the PDP context for the UE 802. The source IGSN 808 stores the new IGSN address 826 at action 828 in order to be able to forward data packets to the target IGSN 820, and in action 829, the source IGSN 808 stops the transmission of the packet data to the UE 802. The source IGSN 808 further responds with an SGSN context response message 830 that comprises an acknowledgement for each Logical Link Control layer (LLC) connection used by the UE 802. In action 834, various security functions may be performed for Authentication, Authorization and Accounting. UMTS/GPRS security protects the network between the UE and the IGSN. In addition, the users association with their home AAA server are protected by the UMTS authentication procedures. Further, at step 836, the target IGSN 820 activates the PDP context for the UE 802, and sends to the source IGSN 808 an SGSN Context Acknowledgement message 838 in order to inform that it is ready to receive data packets intended for the UE 802, which related PDP context was just activated. According to the invention, in action 840, a Tunnel_Aggr2_Request message is sent from the target IGSN 820 to the Ingress Router 128 acting as an Edge Node of the transit network, for requesting the assignment of an appropriate LSP between the source routing area 122, where the UE 802 started the ongoing data session 804, and the target routing area C 125 where the UE 802 has just roamed for the purpose of sending the data flows of the ongoing data session toward the new location of the UE 802. In action 842, the Ingress Router 128 contacts the TE-CMS 850 via a Pre-Def_LSP_Level2_Request message sent, for example, to a pre-determined port, in order to request the appropriate LSP to be used between the source routing area 122 and the target routing area 125. The TE-CMS 850 may also propagate this request to the Source IGSN 808 via message 844 for the purpose of also advising the Source IGSN 808 to consider a tunnel between itself and the Target IGSN 820. Thereafter, the TE-CMS 850 provides the concluding best LSP path(s) to the Ingress/Egress routers 128, 136, and 138 based, for example upon QoS Code Points, actions 846. The router configuration is initiated accordingly in order to procure the new LSPs, and the transit-network 126 advises the target IGSN 820 that the LSPs 860 are ready to operate, action 848. Finally, data packets are forwarded on the newly established LSPs 860 between the source IGSN of the source routing area 122 and the target IGSN 816 of the target routing area that now serves the UE 802.

The routing area update process is completed using known procedures 864-878 as described in the standard Third Generation Partnership Project (3GPP) TR 23.923 V.3.0.0, "Combined GSM and Mobile IP Mobility Handling in UMTS IP CN", 3GPP, May 2000), herein included by reference.

According to a further embodiment of the present invention, the second preferred embodiment of the invention related to the aggregation based on the destination routing area may be further utilized for defining and using a Virtual Private Network (VPN) for a given user group. Such a VPN may use the Border Gateway Protocol (BGP) and may be placed as overlay to the MPLS-based tunneling between different routing area, as described beforehand with relation to FIGS. 3-7. In GPRS-based core networks, the Access Point Name (APN) is an identifier of the access point to an external network. It informs the SGSN which GGSN to use and informs the GGSN which external data network to use. An APN consists of two parts:

the APN network identifier, which identifies the external network being accessed, e.g. equivalent to a domain name in the public Internet; and the APN operator identifier, which is optional and would identify the network used in roaming.

According to the invention, the APN may be used to decide to which IP address the LSP is terminated. In addition, the APN identifies the external network by its IP address. Thus, the APN can also be used to determine to which IP address a subsequent LSP from IGSN is terminated. Therefore, according to the invention, a VPN-ID used for the purpose of BGP based MPLS VPN can then be deducted from the APN, and specifically from the Network Identifier part of the APN. The external network referred to, becomes then a VPN to a group of user, as per the VPN-ID used.

Figure 9:
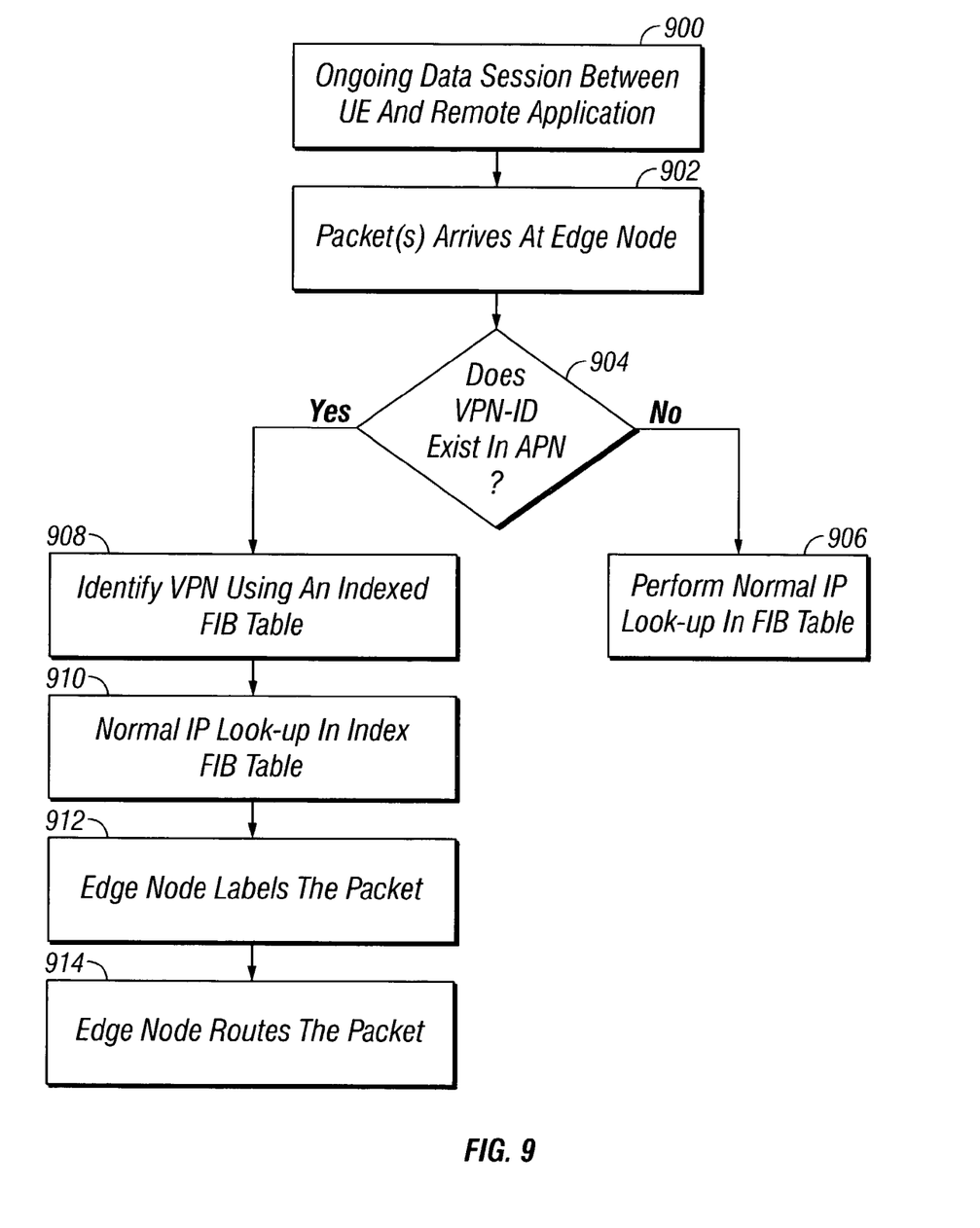
FIG. 9 is a simplified flowchart diagram of an exemplary call scenario illustrating the Virtual Private Network (VPN) implementation as a variant of the $2^{nd}$ preferred embodiment of the invention.

Reference is now made to FIG. 9, which is a simplified flowchart diagram exemplary call scenario illustrating the VPN implementation as a variant of the 2$^{nd}$ preferred embodiment of the invention. At step 900, the UE 802 carries on a data communication with the remote application 806 using the LSPs aggregation based on the destination routing area as described beforehand. When VPN-based data traffic is routed, for example from UE 802 to the remote application 806, the Edge router 128 receives a packet of the ongoing data session from the UE 802, action 902. At step 904, the Edge Node uses the VPN-ID extracted from the APN to identify the VPN that the packet belongs to. If no known VPN-ID is found in the APN, then in step 906 a non-indexed Forwarding Information Base (FIB) is used for routing the packet toward its destination. Otherwise, if a known VPN-ID is detected in the APN, at step 904, the VPN is identified by having the Edge Node querying its Indexed Forwarding Information Base (I-FIB), step 908. An I-FIB may be a three-dimensional table, wherein a normal FIB table may exist for each VPN that is set-up in the Edge Node, therefore adding the third-dimension, or the index, to the individual FIB tables that exist for each such VPN. Further in step 910, once the index associated with the VPN is identified, the Edge Node performs normal IP lookup in the FIB table of that VPN, using for example the Forward Equivalence Class (FEC) of that packet, that may be in turn based on the destination-IP address of the packet. As a result, the Edge Router adds the label information associated with the LSP to the packet, step 912, and forwards the packet, step 914.

Therefore, with the current invention, it becomes possible to trigger a VPN path, when provided with pre-defined paths. The information related to the second level layer may be propagated via BGP (Border Gateway Protocol) together with the VPN-ID routes. The LSP paths are the same as previously described except that they are not public but rather private because they have a path-to-VPN ID binding established in the FIB of the Ingress/Egress routers. To go VPN path as opposed to non-VPN path becomes an option offered by the Ingress/Egress routers already set to handle Level1/Level2 aggregation paths.

Based upon the foregoing, it should now be apparent to those of ordinary skills in the art that the present invention provides an advantageous solution, which offers data flows aggregation based on various criteria, such as for example based on a QoS class or a destination routing area identity, or a combination thereof. Although the system and method of the present invention have been described in particular reference to certain radio telecommunications messaging standards (for example, GPRS, UMTS), it should be realized upon reference hereto that the innovative teachings contained herein are not necessarily limited thereto and may be implemented advantageously with any applicable radio telecommunications standard. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow. For example, while the first and second preferred embodiment of the invention have been separately described, it is understood that they can be implemented together, by having a first level of data flows aggregation into one or more LSPs based on the QoS class, and a second level of LSPs aggregation into other LSP(s) based on the destination routing area.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for packet data transmission in a packet switched cellular telecommunications system, the method comprising the steps of:
   receiving data flows in a network node of the packet switched cellular telecommunications system, the data flows comprising Multi Protocol-Label Switching (MPLS) Label Switched Paths (LSPs); and
   aggregating said data flows into at least one MPLS LSP based on at least one criterion comprising a destination Routing Area (RA) of the data flows;
   wherein the network node is an Edge Node of a routing area of the packet switched cellular telecommunications system.

2. The method claimed in claim 1, wherein the at least one criterion comprises a Quality of Service (Qos) class associated with each one of said data flows;
   wherein said data flows originate from User Equipments (UEs) defining the QoS class for each one of said data flows; and
   wherein data flows having the same QoS class are aggregated into the at least one MPLS LSP.

3. The method claimed in claim 2, wherein the network node aggregates said data flows based on a table of correspondence between the QoS classes and a label of the at least one MPLS LSP.

4. The method claimed in claim 1, wherein the network node is a Radio Network Controller (RNC) of the packet switched cellular telecommunications system.

5. The method claimed in claim 1, wherein the network node is a Serving General Packet Radio Service (GPRS) Support Node (SGSN) of the packet switched cellular telecommunications system.

6. The method claimed in claim 1, wherein the Edge Node is a Gateway General Packet Radio Service (GPRS) Support Node (GGSN), wherein the LSP data flows are aggregated into the at least one MPLS LSP based on their destination routing area.

7. The method claimed in claim 6, wherein the GGSN aggregates said LSP data flows based on a table of correspondence between the destination routing area and a label of the at least one MPLS LSP.

8. The method claimed in claim 1, wherein at least one of the data flows originate from a User Equipment (UE) of a source routing area, the network node is an edge node of the source routing area, and wherein the method further comprises the steps of:
   initiating an UE inter-routing area handoff between the source routing area and a target routing area where the UE roams;
   establishing an LSP tunnel between the source routing area and the target routing area; and
   forwarding the data packets on the LSP tunnel from the source routing area to the target routing area.

9. The method claimed in claim 8, wherein the LSP tunnel is established using aggregated LSPs.

10. The method claimed in claim 1, wherein the at least one MPLS LSP forms a virtual private network (VPN).

11. The method claimed in claim 10, wherein the network node is an edge node of a soume routing area, and the method further comprises the steps of:

receiving a packet of a data flow from said data flows at the edge node;
detecting a VPN Identity in said packet;
identifying a VPN associated with said VPN identity; and
routing said packet over said VPN.

12. The method claimed in claim 11, wherein the VPN identity is detected in an Access Point Name (APN) of said packet, and the step of routing said packet comprises labelling said packet with an LSP label associated to the at least one MPLS LSP of the VPN.

13. A packet switched cellular telecommunications system comprising:
   a plurality of User Equipments (UEs) generating data flows from a first routing area;
   a network node receiving said data flows and aggregating said data flows into at least one Multi Protocol Label Switching (MPLS) Label Switched Path (LSP) based on at least one criterion comprising a destination routing area of the data flows;
   wherein the data flows are MPLS LSPs originating from the first routing area, wherein the MPLS LSP data flows are aggregated into the at least one MPLS LSP based on their destination routing area; and wherein the network node is an Edge Node of the first routing area of the packet switched cellular telecommunications system.

14. The system claimed in claim 13, wherein:
   each UE from the plurality of UEs defines a QoS class for each one of its generated data flows; and
   wherein the at least one criterion comprises the Quality of Service (Qos) class associated with each one of said data flows, and wherein data flows having the same QoS class are aggregated into the at least one MPLS LSP.

15. The system claimed in claim 14, wherein the network node further comprises:
   a table of correspondence between the QoS class and a label of the at least one MPLS LSP;
   wherein the network node aggregates said data flows into the at least one MPLS LSP based on said table of correspondence.

16. The system claimed in claim 13, wherein the network node is a Radio Network Controller (RNC) of the packet switched cellular telecommunications system.

17. The system claimed in claim 13, wherein the network node is a Serving General Packet Radio Service (GPRSO Support Node (SGSN) of the packet switched cellular telecommunications system.

18. The system claimed in claim 13, wherein the Edge Node is a Gateway GPRS Support Node of the first routing area virtually connected with the destination routing area via said at least one MPLS LSP.

19. The system claimed in claim 18, further comprising:
   a table of correspondence between the destination RA and a label of the at least one MPLS ISP;
   wherein the GGSN aggregates said MPLS LSPs based on the table of correspondence between the destination routing and the label of the at least one MPLS LSP.

20. The system claimed in claim 13, wherein at least one of the data flows originates from a User Equipment (UE) of a source routing area, the network node is an edge node of the source routing area, and wherein the UE initiates an inter-routing area handoff between the source routing area and a target routing area where the UE roams, and responsive to the initiation of the handoff request an LSP tunnel is established between the source routing area and the target routing area, wherein data packets are forwarded on the LSP tunnel from the source routing area to the target routing area.

21. The system claimed in claim 20, wherein the LSP tunnel is established using aggregated LSPs.

22. The system claimed in claim 13, wherein the at least one MPLS LSP forms a virtual private network (VPN).

23. The system claimed in claim 22, wherein the network node is an edge node of a source routing area, and wherein the edge node receives a packet of a data flow from said data flows, detects a VPN Identity in said packet, identifies a VPN associated with said VPN identity, and routes said packet over said VPN.

24. The system claimed in claim 23, wherein the VPN identity is detected in an Access Point Name (APN) of said packet, and for routing the packet the edge node also labels said packet with an LSP label associated to the at least one MPLS LSP of the VPN.

* * * * *